United States Patent [19]
Heysek

[11] Patent Number: 5,505,753
[45] Date of Patent: Apr. 9, 1996

[54] AIRCRAFT PNEUMATIC AIR FILTER

[76] Inventor: Ralph G. Heysek, 864 W. River Rd., Valley City, Ohio 44280

[21] Appl. No.: 304,254

[22] Filed: Sep. 12, 1994

[51] Int. Cl.$^6$ .......................... B01D 27/06; B01D 35/143
[52] U.S. Cl. .................. 55/274; 55/502; 55/510; 55/528; 55/DIG. 5
[58] Field of Search ................ 55/274, 275, 495, 55/497, 498, 502, 510, 521, 528, DIG. 5; 96/26, 117

[56] References Cited

U.S. PATENT DOCUMENTS

| | | | |
|---|---|---|---|
| 1,839,379 | 1/1932 | Downing | 55/274 X |
| 2,873,858 | 2/1959 | Urbon | 55/497 X |
| 3,002,870 | 10/1961 | Belgarde et al. | 55/498 X |
| 3,068,831 | 12/1962 | Witchell | 55/274 X |
| 3,635,001 | 1/1972 | Komroff et al. | 55/274 |
| 3,772,857 | 11/1973 | Jackson et al. | 55/510 X |
| 3,815,754 | 6/1974 | Rosenberg | 55/497 X |
| 4,036,616 | 7/1977 | Byrns | 55/498 |
| 4,062,781 | 12/1977 | Strauss et al. | 55/498 X |
| 4,063,913 | 12/1977 | Kippel et al. | 55/274 |
| 4,172,709 | 10/1979 | Kippel et al. | 55/274 |
| 4,177,149 | 12/1979 | Rosenberg | 96/6 X |
| 4,326,957 | 4/1982 | Rosenberg | 96/6 X |
| 4,544,387 | 10/1985 | Agerlid | 55/274 |
| 4,886,533 | 12/1989 | Sakashita et al. | 55/502 X |
| 4,966,550 | 10/1990 | Privat | 55/274 X |
| 4,999,034 | 3/1991 | Mager et al. | 55/275 X |
| 5,110,330 | 5/1992 | Loughran | 55/275 X |
| 5,131,932 | 7/1992 | Glucksman | 55/274 |

FOREIGN PATENT DOCUMENTS

| | | | |
|---|---|---|---|
| 1-018423 | 1/1989 | Japan | 55/495 |
| 1-013529 | 3/1989 | Japan | 55/275 |

Primary Examiner—Robert Spitzer
Attorney, Agent, or Firm—Renner, Kenner, Greive, Bobak, Taylor & Weber

[57] ABSTRACT

An aircraft pneumatic air filter includes a pair of cup-shaped interconnected cover having respective inflow and outflow nozzles and a filter cartridge maintained in the cavity defined therebetween. A scale provided on one of the covers allows for visual inspection of the filter cartridge and comparison against the scale to determine the need for filter replacement or system service.

16 Claims, 3 Drawing Sheets

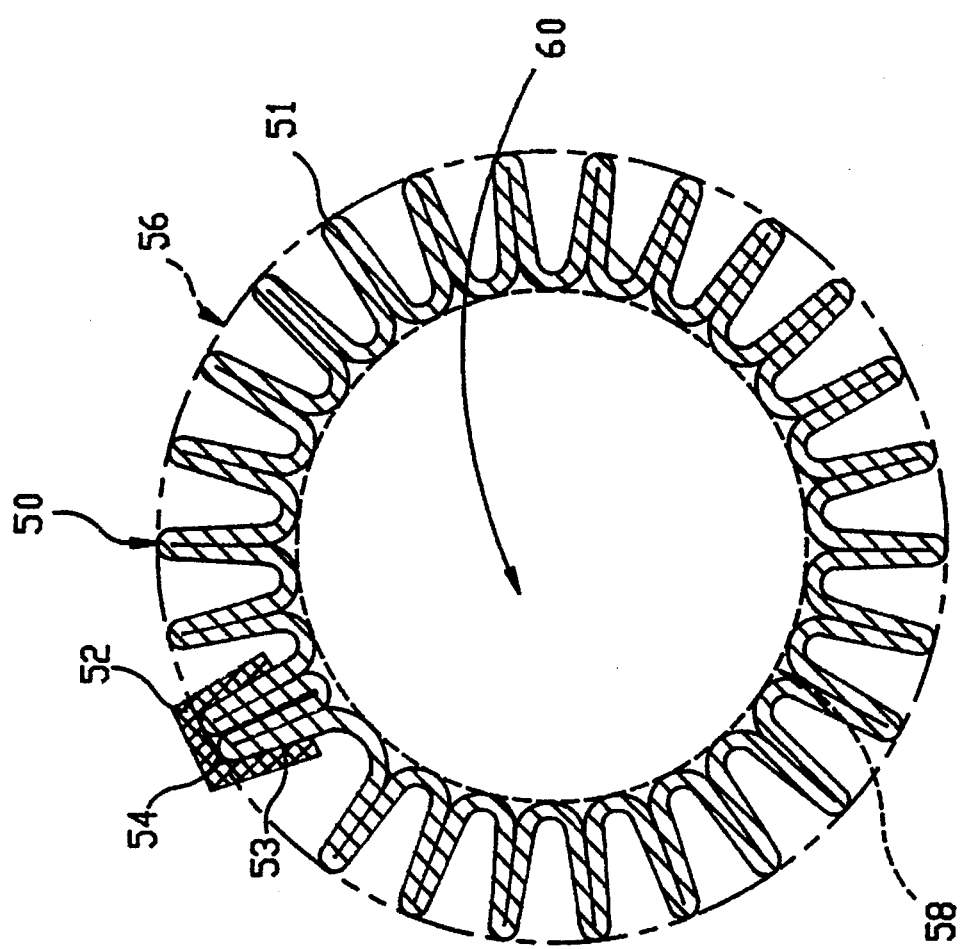

AIRCRAFT PNEUMATIC AIR FILTER

TECHNICAL FIELD

The invention herein resides in the art of air filters employed to filter air delivered from a pump to a plurality of pneumatic instruments. More particularly, the present invention relates to an aircraft pneumatic air filter that alleviates the need for mandatory replacement of the pneumatic air filter as required by a predetermined maintenance schedule. Specifically, the invention relates to an aircraft pneumatic air filter which provides a visible indication of when the air filter has reached a predetermined level of ineffectiveness.

BACKGROUND ART

It is well known that filters are employed to remove contaminants from liquids or gases so as to purify the same. In the environment of pneumatically controlled instruments, these impurities or contaminants are removed to prevent their failure or ineffective operation. Generally, pneumatically controlled instruments function the same as those of an electric or hydraulic controller. The distinguishing feature of a pneumatic controller is that air pressure is used as the controlling medium instead of electricity or hydraulic pressure. In general, pneumatic controllers are available with the various types of controls—two position, proportional, proportional plus integral, proportional plus derivative, and proportional plus integral plus derivative actions—that are available in electric controllers. These systems are useful in sensing a change in position. As such, the measured variable, when changing, creates differences in force (pressure) rather than actual small movements of an element in space (as in a position balance system).

It is also known that some aircraft instruments are supplied with pneumatic air pressure so that the instruments may be controlled gyroscopically. In particular, a gyrohorizon indicator has a gyro with a plurality of vanes which receives system air pressure at its outer circumference causing the gyro to spin similar to a paddle wheel. The spinning gyro (8 to 10,000 rpm) remains in a fixed position relative to the earth so as to display true vertical and horizontal information regardless of the attitude of the aircraft. Therefore, a horizon bar attached to the gyro always remains parallel with the earth's horizon so as to provide the pilot with a level reference. A directional gyro indicator operates in a similar manner. The directional gyro has a stationary ring attached to the spinning gyro and is marked with various compass degrees. Once established in flight, the gyro is stabilized such that the aircraft literally moves around the stationary fixed gyro. This allows the pilot to determine the direction of the aircraft by reading the compass degrees off the stationary ring.

For the aforementioned pneumatically controlled aircraft instruments to function properly, supply of an unfettered source of pressurized air is required. As such, it is well known to provide a pneumatic air filter between a pressure regulator driven by a pump and the instruments to be controlled. These known pneumatic air filters are only checked on two occasions. The first occasion is when one of the indicators or instruments supplied by the pressure regulator malfunctions or is behaving improperly. The other occasion is when a prescribed maintenance program requires that the pneumatic air filter be changed. The changing of the pneumatic air filter is usually done without regard as to whether the air filter has lost its effectiveness.

It is well known to provide pneumatic air filters in metal housings or other similar rigid structures. Pneumatic air filters contained within metal housings have several positive features. A metal housing provides a sturdy structure that is not easily damaged, can withstand excessive heat, and is effective in preventing contaminates from entering the pneumatic air supply system.

However, pneumatic air filters contained within metal housings have several drawbacks. Primarily, known pneumatic air filters contained within metal housings do not provide a clear indication of when the filter needs to be replaced with a new filter. Nor, do the known air filters provide a visual indication of the amount of contamination between the filter and a failed air pump following an air pump failure.

It is clear that there is a need in the art for an aircraft pneumatic air filter that provides a visible indication of when the filter media is no longer capable of functioning properly. There is also a need in the art for an aircraft pneumatic air filter that is easily maintainable and can withstand the harsh environment associated with the internal control systems of aircraft. There is a further need for an aircraft pneumatic air filter which provides a total cost savings when compared with the known art of such pneumatic air filters.

DISCLOSURE OF THE INVENTION

In light of the foregoing, it is a first aspect of the invention to provide an aircraft pneumatic air filter with a visual indicator of when the pneumatic air filter should be replaced.

Another aspect of the invention is to provide an aircraft pneumatic air filter with a substantially transparent housing which provides a visible color comparator to determine the effectiveness of an enclosed filter media.

Still a further aspect of the invention is to provide an aircraft pneumatic air filter with a substantially transparent housing such that the air flow between a pressure regulator and a plurality of control instruments is effectively filtered.

An additional aspect of the invention is to provide an aircraft pneumatic air filter that is lighter in construction than those of the prior art, thereby providing a fuel savings to the aircraft in which it is installed.

Yet a further aspect of the invention is to provide an aircraft pneumatic air filter with a substantially transparent housing made of polymeric material and a filter media made of polyester that allows potting material used therein to be cured by conventional or microwave processes.

A further aspect of the invention is to provide an aircraft pneumatic air filter where the enclosed filter media is a polyester that can withstand a high temperature of operation and will not sustain a flame if ignited.

Yet another aspect of the invention is to provide an aircraft pneumatic air filter where the filter media is made of a polyester material such that any combustion thereof emits a non-toxic smoke.

A further aspect of the invention is to provide an aircraft pneumatic air filter that is rated for continuous use at 300° F.

The foregoing and other aspects of the invention which shall become apparent as the detailed description proceeds, are achieved by an aircraft pneumatic air filter for monitoring the effectiveness of a filter media, comprising a substantially transparent filter housing having at least one inlet and at least one outlet; a filter media received within the filter housing; and a filter effectiveness indicator affixed to the filter housing to provide a visible indication of when the filter media has attained a preselected level of ineffectiveness.

The present invention also provides a method for manufacturing an aircraft pneumatic air filter including the steps of: providing a substantially transparent outflow cover having an outwardly extending outflow nozzle and an inwardly extending annular ring which is concentric with the outflow nozzle; securing one end of a filter media around the annular ring and the opposite end of the filter media to a deflecting cap with potting material; securing a substantially transparent inflow cover to the outflow cover over the filter element, the inflow cover having an inflow nozzle, one of the inflow and outflow covers having a filter effectiveness indicator attached thereto; and curing the potting material.

BRIEF DESCRIPTION OF THE DRAWINGS

FIG. 3 is a top elevational view of a filter media disposed within an aircraft pneumatic air filter housing.

BEST MODE FOR CARRYING OUT THE INVENTION

Figure 1:
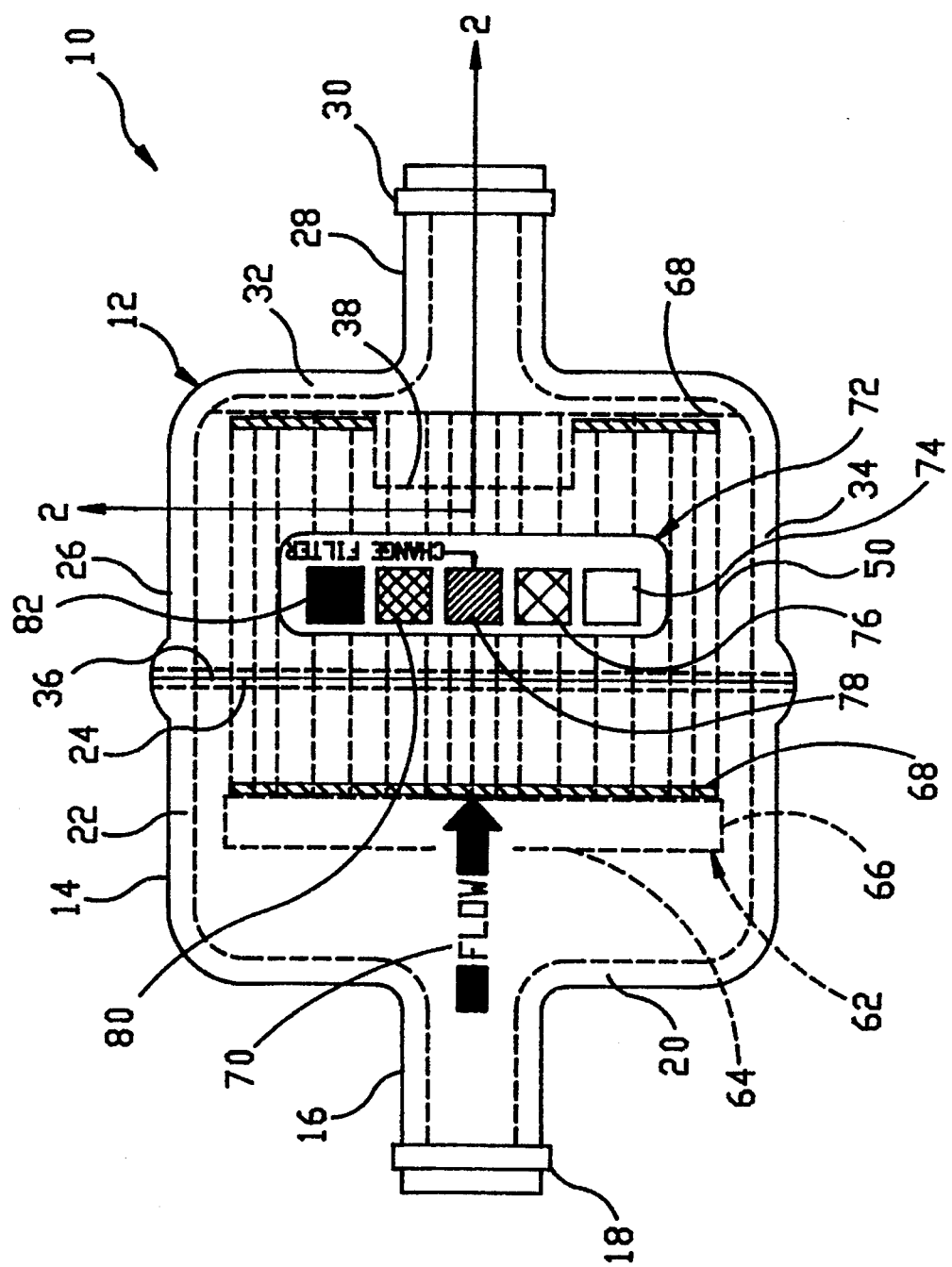
FIG. 1 is a side elevational view of an aircraft pneumatic air filter according to the present invention.

Referring now to the drawings and more particularly to FIG. 1, it can be seen that an aircraft pneumatic air filter according to the present invention is designated generally by the numeral 10. Typically, the aircraft pneumatic air filter 10 is contained within a pneumatic air supply system, wherein a pump supplies a source of air to a pressure regulator that is connected to the inflow of the filter to remove any impurities. The air flow is then directed from the filter to a plurality of gyro instruments located on the aircraft instrument panel and to wing deicing components for those aircraft so equipped. The aircraft pneumatic air filter 10 has a filter housing 12 which includes an inflow cup-shaped cover 14 mateably secured to an outflow cup-shaped cover 26.

The inflow cover 14 has an intake nozzle 16 extending outwardly therefrom. Disposed around the periphery of the intake nozzle 16 is a nozzle ridge 18 to assist in effecting a seal with a tube or conduit received over the nozzle 16. Extending radially outwardly from an end of the intake nozzle 16 is a disk-shaped end wall 20. Extending outwardly from the end wall 20 is a cylindrical sidewall 22 that terminates at a mating lip 24.

Mateably secured to the mating lip 24 of the inflow cover 14 by a commercially available solvent is an outflow cover 26. In a construction similar to the inflow cover 14, the outflow cover 26 has an outflow nozzle 28. Disposed around the periphery of the outflow nozzle 28 is a nozzle ridge 30, again for sealing purposes. Extending radially outwardly from an end of the outflow nozzle 28 is disk-shaped end wall 32. Extending outwardly from the end wall 32 is a cylindrical sidewall 34 which terminates at a mating lip 36. It should be appreciated that the mating lip 36 is configured such that the mating lip 24 is easily interconnected therewith. In the preferred embodiment of the invention, the lips 24, 36 comprise complimentary ring and groove peripheries.

Figure 2:
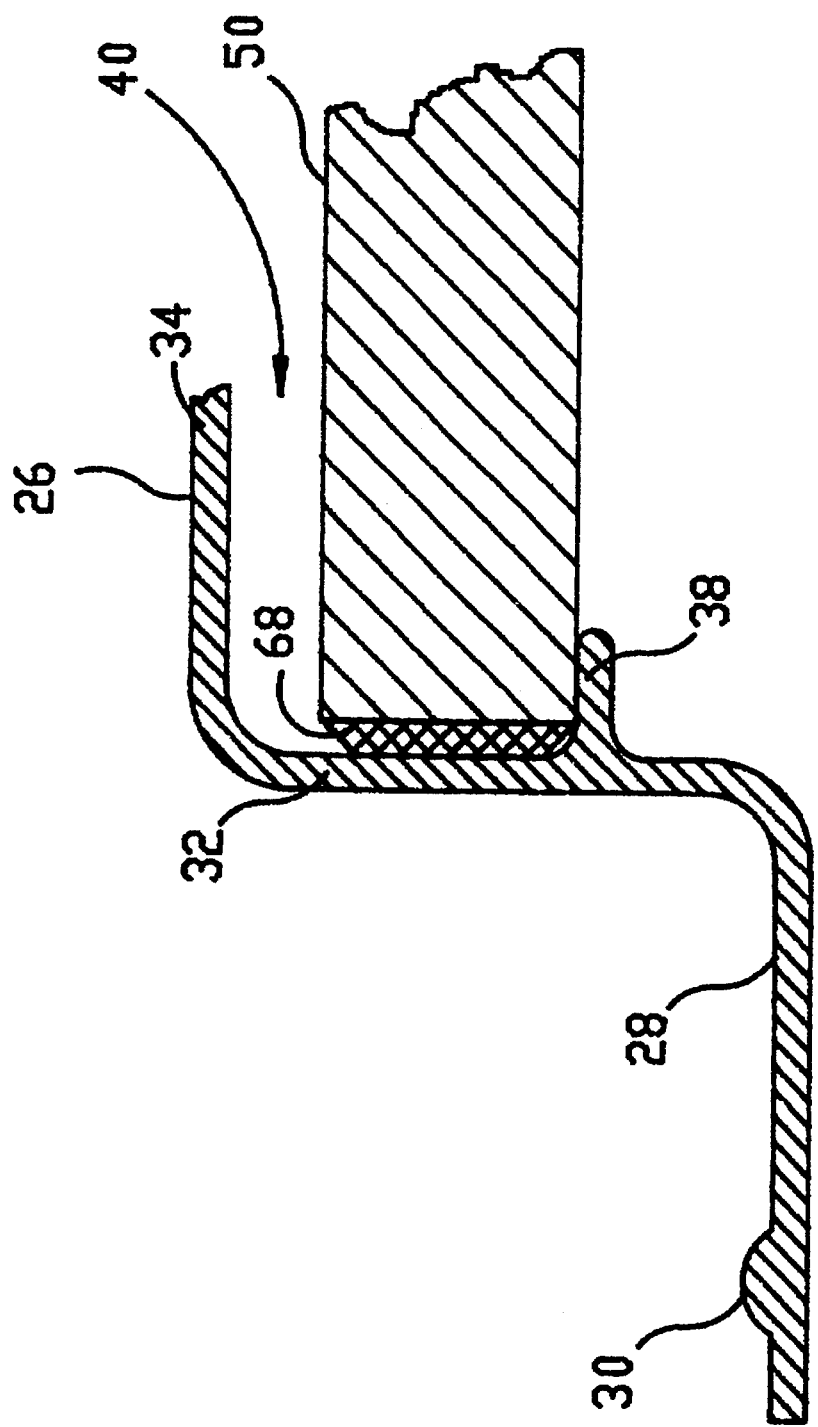
FIG. 2 is a partial sectional view of an outflow cover taken substantially along the lines 2—2 of FIG. 1.

As best seen in FIG. 2, a ring wall 38 extends outwardly from the end wall 32 about the opening of the outflow nozzle 28. The ring wall 38 has a diameter larger than that of the outflow nozzle 28, and a diameter smaller than that of the sidewall 34. Thus, the area between the sidewall 34 and the ring wall 38 forms a filter chamber 40.

Disposed within the filter chamber 40 is a filter media 50, also referred to as a filter cartridge or element. As shown in FIG. 3, the filter media 50 is of a tubular nature, formed of a plurality of pleats 51 in an appropriate sheet of filter material or fabric. The filter is formed such that a beginning pleat 52 and an ending pleat 53 are joined together by a clip 54 which is metal or a non-metallic material suitable for operation at 300° F. As a result, the filter media 50 has an outer periphery 56 and an inner periphery 58 so as to provide a cylindrical aperture 60 therethrough.

Referring back to FIG. 1, it can be seen that a deflector cap 62 is disposed over an end of the filter media 50. The deflector cap 62 is cup-shaped, having a top 64 from which outwardly extends a sidewall 66. Potting material 68 secures the filter media 50 at one end to the end wall 32 and at the opposite end to the deflector cap 62. While the filter media 50 is being potted to the deflector cap 62, a plug is preferably inserted into the cylindrical aperture 60 at the opposite end of the filter media so as to maintain the proper diameter of the inner periphery 58 for later insertion around the ring wall 38. It should be appreciated that the deflector cap 62 is proximally located near the intake nozzle 16. A flow indicator 70 is disposed in proximate relationship to the intake nozzle 16 to indicate the proper method of interconnecting the filter housing 12 within the air supply system.

Also contained within or affixed to the housing 12 is a filter use indicator or scale 72. The filter use indicator 72 includes a plurality of color comparators ranging in color from white to black. Specifically, the white color comparator is designated by the numeral 74. Likewise, other color comparators are designated according to the following numerical sequence: light grey 76, grey 78, dark grey 80, and black 82. Accordingly, the scale 72 comprises a gradient from white to black. Furthermore, instructions are included on the filter use indicator 72 to designate at which color the filter media 50 should be replaced.

In the preferred embodiment, the filter housing 12, which includes the inflow cover 14, the outflow cover 26 and the deflector cap 62 are made of a substantially transparent rigid polymeric material such as polyetherimide sold under the trademark ULTEM 1000, which is manufactured by the General Electric Company. Furthermore, the filter media 50 is made of a white polyester material having a minimum filtration efficiency of 99.97 percent. Preferably, the polyester material used does not sustain a flame if ignited nor will it emit a toxic smoke when burning. In the preferred embodiment the potting material 68 comprises a one part compound, heat cured, thixotropic material manufactured by Electro-Insulation Corporation as part number A-316-43, which has a viscosity at 25° C. of 25,000 cps. The potting material is cured by either heating in a conventional oven or on a hot plate at 250° F. for twenty minutes. Alternatively, a similar thixotropic material with a viscosity at 25° C. of 7,000 cps that cures in one hour by the same heating process could be used. This material is manufactured by Electro-Insulation Corporation as part number A-401-37. Additionally, if a non-metallic material is used for the clip 54, either of the foregoing potting materials can be cured in a microwave oven much more quickly than by using conventional heating methods. Furthermore, the potting material 68 will not degrade or adversely affect the filter media 50. The pneumatic air filter 10 is rated for operation at 300° F.

In actual operation the aircraft pneumatic air filter 10 is interconnected between a pressure regulator, which is in communication with a pump, and aircraft monitoring instruments such as a directional gyro indicator, a gyro-horizon indicator, and other similar instruments and devices such as deicing boots. Most pumps used in pneumatic air flow systems for aircraft employ a pump that has carbon vanes and a carbon rotor. Although pumps of this type construction are lightweight and efficient, they tend to emit carbon dust and/or carbon particles. This carbon dust proceeds through the pressure regulator to the intake nozzle 16 of the filter housing 12 via an interconnecting conduit disposed around the nozzle ridge 18 and secured thereto. Proceeding through the intake nozzle 16, the pressurized air impacts upon the deflector cap 62 and proceeds down the cavity defined between the sidewalls 22 and 34. As the pressurized air passes through the filter media 50, the carbon dust is separated from the pressurized air by the filter media with the filtered air then entering the cylindrical aperture 60. The filtered air then proceeds out the outflow nozzle 28 and into the desired aircraft gyro instruments. As discussed earlier, for the efficient operation of the aforementioned instruments and indicators, it is imperative to have a clean supply of air. Otherwise, the instruments could become damaged and malfunction, therefore creating the perception of a safe situation to the pilot when, in fact, a dangerous one exists.

Those skilled in the art will appreciate that the filter housing 12 is both rigid and substantially transparent by employing a polymeric material that is functionally equivalent to metal or similar material. By virtue of using a substantially clear material for the filter housing 12, the filter element 50 may be visually inspected by a mechanic during maintenance or by a pilot/crew member during a pre-flight inspection. Furthermore, because the filter media 50 is white in color, it is easy to determine when a substantial amount of carbon dust has been deposited thereon. The filter use indicator or scale 72 provides a facile means to determine when the filter media 50 has blinded sufficiently to restrict the flow of air to the indicators or no longer be effective in containing the carbon dust. The filter use indicator 72 has a series of color comparators employed to determine when the filter media 50 has reached a point of ineffectiveness. The color comparators in the preferred embodiment define a gradient from white 74, to light grey 76, to grey 78, to dark grey 80, and finally black 82. The mechanic is trained to replace the aircraft pneumatic air filter 10 with a new filter when the filter media 50 changes color to match that of the grey color comparator 78. Those skilled in the art will appreciate that the number of color comparators could be increased or decreased depending upon the specific need of the aircraft airflow system. Of course, the time at which the filter is changed with respect to the scale 72 may vary as desired.

The benefits of the present invention are readily apparent. Prior art pneumatic air filters were periodically replaced according to a predetermined maintenance schedule. In other words, after the aircraft had been in use for a predetermined number of hours, the pneumatic air filter would be replaced whether it needed to be or not. In such systems, replacement of the filter media may not have occurred until long after filter failure. Another drawback of the prior art air filters is that no visible indication of its condition is provided. For example, if high system pressures are created due to pressure regulator problems or de-ice system malfunctions, the carbon air pump vanes and rotors wear at an accelerated rate, thereby adding more carbon dust to the system than normal so as to reduce the effectiveness of the filter media 50.

To overcome these drawbacks, the present invention allows the mechanic to quickly inspect the air filter to determine if there has been a breakdown in the pump components or if it is time for the aircraft pneumatic air filter 10 to be replaced due to normal use. Furthermore, the mechanic can easily check the filter media 50 by monitoring the rate at which the filter is being contaminated. Thus, if the filter media 50 attains a pre-determined color comparator sooner than normally expected, the mechanic can check the overall pneumatic system for malfunctioning components. Typically, use of the present invention provides a cost savings as the filter only needs to be changed due to normal wear of the pump or when a serious problem exists. Furthermore, the polymeric construction of the aircraft pneumatic air filter 10 is lighter than the metal housing used in the prior art and results in fuel savings for the aircraft. As discussed earlier, if a nonmetallic clip 54 is utilized to join the beginning pleat 52 to the end pleat 53, the potting material 68 used to secure the filter media 50 to the deflector cap 62 and end wall 32 is cured in a microwave oven instead of a conventional oven. This, of course, saves manufacturing time and energy costs in the manufacturing process.

The assembly of the air filter 10 is greatly simplified by the structure presented herein. Potting material is placed in the cup of the deflector cap 62, which then receives the end of the pleated tubular filter media 50. The potting material is cured at this time with a plug inserted into the cylindrical aperture 60 at an end opposite the deflector cap 62 to maintain the dimensions of the same while the assembly is heated or the potting is otherwise cured. Subsequently, the plug is removed and the open end of the aperture 60 is received over the ring wall 38 with the pleated ends of the filter media 50 being received in potting material spread upon the end wall 32 about the ring wall 38 and then cured. Next, the cup shaped covers 14, 26 may be joined together by the mating interconnection of the lips 24, 36 which preferably have a solvent or suitable adhesive therebetween. In any event, it will be appreciated that any of a number of assembly procedures may be employed to attain the desired end result.

Thus, it can be seen that the objects of the invention have been satisfied by the structure presented above. It should be apparent to those skilled in the art that the objects of the present invention could be practiced in any type of pneumatic air flow system or with any size filter housing.

While the best mode and preferred embodiment of the invention has been presented and described in detail, it will be understood that the invention is not limited thereto or thereby. Particularly, various materials and configurations may be used in the construction of the invention to meet the various needs of the end user. Accordingly, for an appreciation of the true scope and breadth of the invention, reference should be made to the following claims.

What is claimed is:

1. An aircraft pneumatic air filter, comprising:

a substantially transparent filter housing having at least one inlet and at least one outlet;

a filter media received within said filter housing; and a filter effectiveness indicator affixed to said filter housing to provide a visible indication of when said filter media has attained a pre-selected level of ineffectiveness, wherein said filter effectiveness indicator provides a plurality of color comparators ranging from white to black such that when the color of said filter media is equivalent to a pre-selected color comparator, the filter effectiveness indicator suggests that said aircraft pneumatic air filter be replaced.

2. An aircraft pneumatic air filter according to claim 1, wherein said filter housing has an inflow cover securably attached to an outflow cover, said outflow cover having an internal ring wall.

3. An aircraft pneumatic air filter according to claim 2, wherein one end of said filter media is disposed over and secured to said ring wall, the opposite end of said filter media being received within and secured to a deflector cap.

4. An aircraft pneumatic air filter according to claim 3, wherein said filter media is secured to said ring wall and said deflector cap by potting material.

5. An aircraft pneumatic air filter according to claim 3, wherein said filter media is folded into a plurality of pleats having a beginning pleat and an ending pleat, said beginning and ending pleats being joined together by a clip such that said filter media has an outer periphery and an inner periphery.

6. An aircraft pneumatic air filter according to claim 5, wherein said filter media is made of a white polyester material that will not sustain a flame once ignited.

7. An aircraft pneumatic air filter according to claim 6, wherein said filter housing comprises the material polyetherimide.

8. An aircraft pneumatic air filter according to claim 7, wherein said inflow cover is secured to said outflow cover by a solvent.

9. An aircraft pneumatic air filter according to claim 8, wherein said filter housing has an air flow indicator.

10. An aircraft pneumatic air filter for monitoring the effectiveness of a filter media, comprising:

means for receiving a filter media, said receiving means having at least one inlet and at least one outlet and comprising a substantially transparent filter housing;

means for visibly inspecting said filter media; and means for comparing said filter media to a preselected criteria of filter effectiveness, wherein said comparing means is affixed to said filter housing and comprises a gradient of color comparators ranging from white to black to accommodate determining when the color of said filter media has exceeded a preselected color comparator.

11. An aircraft pneumatic air filter according to claim 10, wherein said filter housing comprises the material polyetherimide.

12. A method for manufacturing an aircraft pneumatic air filter comprising the steps of:

providing a substantially transparent outflow cover having an outwardly extending outflow nozzle and an inwardly extending ring wall which is concentric with said outflow nozzle;

securing with potting material one end of a filter media around said ring wall and the opposite end of said filter media to a deflecting cap; and securing a substantially transparent inflow cover to said outflow cover over said filter media, said inflow cover having an inflow nozzle, one of said inflow and outflow covers having a filter effectiveness indicator attached thereto, wherein said filter effectiveness indicator comprises a spectrum of colors ranging from white to black and is employed to compare said filter media thereto.

13. A method according to claim 12, wherein said filter media is folded into a plurality of pleats having a beginning pleat and an ending pleat, said beginning and ending pleats being joined together by a clip such that said filter media has an outer periphery and an inner periphery.

14. A method according to claim 13, wherein said filter media comprises a white polyester material that will not sustain a flame once ignited.

15. A method according to claim 14, wherein said inflow cover, said outflow cover and said deflecting cap comprise the material polyetherimide.

16. A method according to claim 15, wherein one of said inflow cover and said outflow cover has an airflow indicator.

* * * * *